United States Patent
Ozawa

(10) Patent No.: US 8,457,690 B2
(45) Date of Patent: Jun. 4, 2013

(54) MULTI-HOUSING MOBILE TERMINAL

(75) Inventor: Jiro Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 274 days.

(21) Appl. No.: 12/373,699

(22) PCT Filed: Jul. 18, 2007

(86) PCT No.: PCT/JP2007/064164
§ 371 (c)(1),
(2), (4) Date: Jan. 13, 2009

(87) PCT Pub. No.: WO2008/010510
PCT Pub. Date: Jan. 24, 2008

(65) Prior Publication Data
US 2010/0004037 A1    Jan. 7, 2010

(30) Foreign Application Priority Data
Jul. 20, 2006  (JP) ................. 2006-198027

(51) Int. Cl.
H04B 1/38    (2006.01)
(52) U.S. Cl.
USPC ............ 455/566; 455/550.1; 455/556.2; 455/575.1; 455/575.3; 455/575.8; 345/1.1; 345/2.2
(58) Field of Classification Search
None
See application file for complete search history.

(56) References Cited

U.S. PATENT DOCUMENTS

| 6,628,244 | B1 | 9/2003 | Hirosawa et al. | |
|---|---|---|---|---|
| 6,643,124 | B1* | 11/2003 | Wilk | 361/679.04 |
| 7,184,718 | B2* | 2/2007 | Newman et al. | 455/90.3 |
| 7,786,951 | B2* | 8/2010 | Huitema et al. | 345/1.2 |
| 2003/0030595 | A1* | 2/2003 | Radley-Smith | 345/1.3 |
| 2005/0164752 | A1* | 7/2005 | Lau et al. | 455/575.3 |
| 2005/0237699 | A1* | 10/2005 | Carroll | 361/600 |
| 2007/0200791 | A1* | 8/2007 | Meyers | 345/1.1 |
| 2008/0186252 | A1* | 8/2008 | Li | 345/1.1 |
| 2009/0079664 | A1* | 3/2009 | Nagai et al. | 345/1.3 |
| 2009/0104931 | A1* | 4/2009 | Chiang | 455/556.1 |

FOREIGN PATENT DOCUMENTS

| DE | 29704171 A | 5/1997 |
|---|---|---|
| DE | 10053790 A | 5/2002 |
| JP | 1993083342 A | 4/1993 |

(Continued)

OTHER PUBLICATIONS

Supplementary European Search Report for EP 07 79 0919 completed Jul. 30, 2010.

(Continued)

Primary Examiner — Rafael Pérez-Gutiérrez
Assistant Examiner — Suhail Khan

(57) ABSTRACT

A mobile terminal having multiple functions allows the user easy operation of a function that they desire. The mobile terminal has first, second, third, and fourth housings. The housings each have front side and back side and have at least an input section or a display section on the front side. The housings are circularly arranged so that the front side of each housing is on the outer side and are connected with each other so that adjacent housings are foldable to each other facing back to back. Preferably, the housings are connected together such that the first and second housings are connected together, the second and third housings are connected together, the third and fourth housings are connected together, and the fourth and first housings are connected together.

9 Claims, 4 Drawing Sheets

| | FOREIGN PATENT DOCUMENTS | | |
|----|----|----|----|
| JP | 1993298257 | A | 11/1993 |
| JP | 1995029978 | A | 6/1995 |
| JP | H07029978 | A | 6/1995 |
| JP | 1998011024 | A | 1/1998 |
| JP | 2000068883 | A | 3/2000 |
| JP | 2005198259 | A | 7/2005 |
| JP | 2006086564 | A | 3/2006 |
| WO | 2005020046 | A1 | 3/2005 |

OTHER PUBLICATIONS

International Search Report for PCT/JP2007/064164 mailed Aug. 28, 2007.
European Communication for EP 07 79 0919 dated Aug. 30, 2010.
Japanese Office Action for JP2008-525877 mailed on Aug. 14, 2012.

* cited by examiner

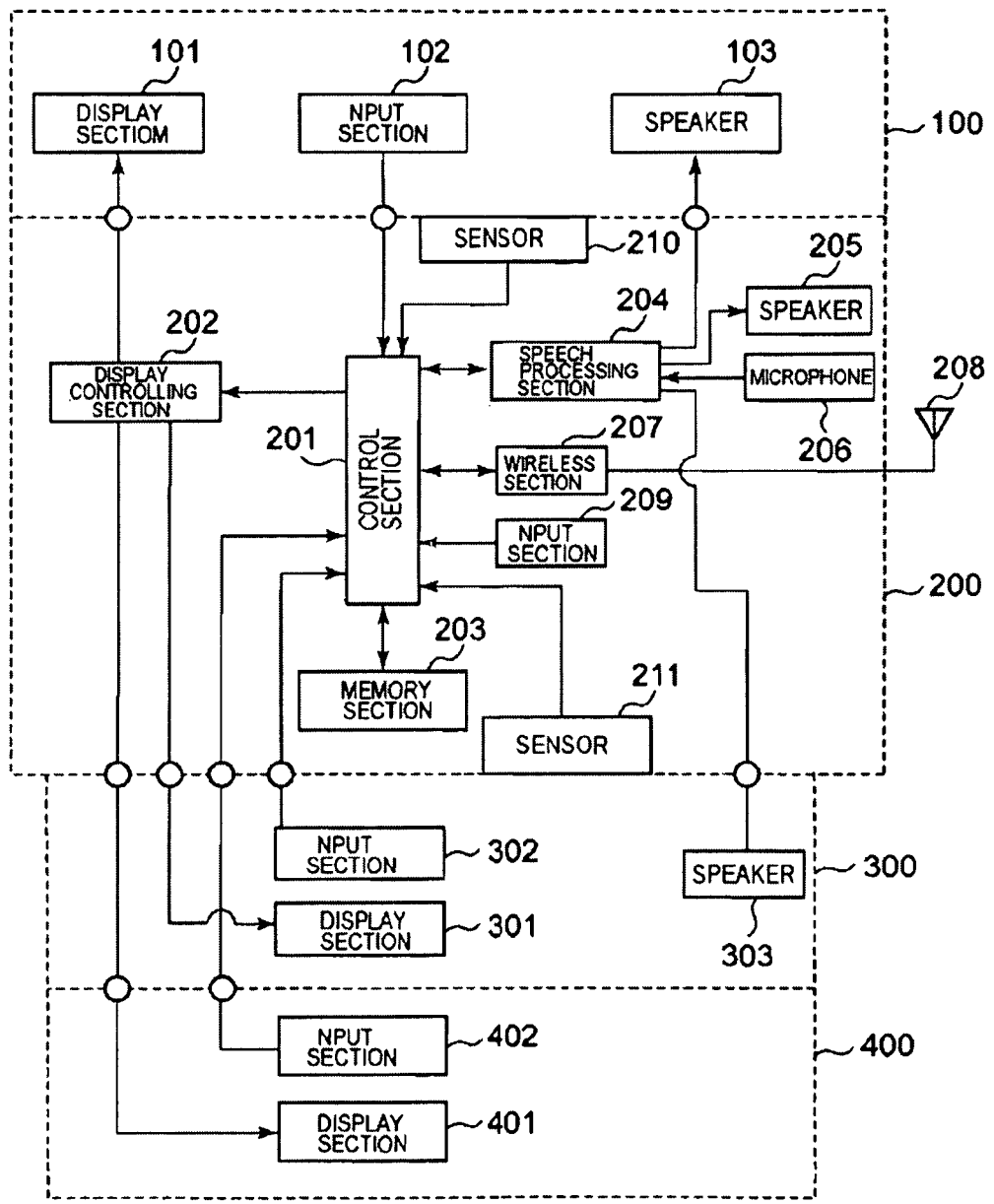

MULTI-HOUSING MOBILE TERMINAL

REFERENCE TO RELATED APPLICATION

This application is the National Phase of PCT/JP2007/064164, filed Jul. 18, 2007, which [based upon and] claims the benefit of the priority of Japanese patent application No. 2006-198027, filed on Jul. 20, 2006, the disclosure of which is incorporated herein in its entirety by reference thereto.

TECHNICAL FIELD

This invention relates to a mobile terminal, such as a foldable mobile phone, corresponding to multipurpose multimedia.

BACKGROUND

Recently, use of mobile phones is diversified and developed in various fields, such as listening music, watching the television and the Internet connection. In such circumstance, many types of mobile phones and others corresponding to multipurpose multimedia having high functions have been developed. The user's demands that the high functions are easily used to enjoy the mobile phone life increase day by day.

In a mobile terminal, especially, a mobile phone, there are many cases that mounting spaces for display section, operation section and others are limited owing to its structure. Because the mounting spaces for the display section, the operation section and others are limited, in the mobile phone having the high functions, the users need to perform complicated operations step by step when they use a desired function.

If the user watches a received picture by using the mobile phone which has multiple functions including a receiving function, for example, the user performs sequentially an operation converting from a standby screen to a main menu and an operation to watch the received picture.

Meanwhile, an ordinary mobile phone has one display section, and the user inputs a telephone number for telephone conversation while looking at the display section and watches the television with the display section. A relatively large display is easy to watch when watching the television. In the mobile phone, however, there are many cases that the mounting space for the display section is limited, and therefore there is a limit to make the display large.

To cope with this Patent Document 1 discloses a mobile electronic device having multiple output displays, a display enlarging mechanism which connects display surfaces of the output displays in one plane side by side, and a display controller which displays one output picture on the output displays dividing the output picture.

On the other hand, since there are many cases where the display section displays something like a telephone number of a communication partner in the telephone conversation, and therefore the display section is not frequently viewed, a large display would not be necessary.

Patent Document 1

JP Patent Kokai Publication No. JP-H05-298257A

SUMMARY OF THE DISCLOSURE

Problems to be Solved by the Invention

The entire disclosure of Patent Document 1 is incorporated herein by reference thereto. The following analysis is provided from the view of the present invention.

If the display can be converted corresponding to any use in a mobile phone having multiple functions, the mobile phone can be used efficiently. However, when a desired function is used, and, especially, when the display is converted corresponding to any use, there is a problem that the converting operations are troublesome because it is necessary for the user to practice complicated operations step by step as explained above.

The present invention is made in view of the above problem. It is an object to provide a mobile terminal having multiple functions in which operation to use a desired function is easy when a desired function is used.

Also, it is an object of the present invention to provide a mobile terminal having a plurality of functions which allows easy change-over of the display screen depending on the utility of a desired function, when using the desired function.

Means to Solve the Problems

According to a first aspect of the present invention, there is provided a mobile terminal comprising a first housing, a second housing, a third housing and a fourth housing having a front side and a back side and having at least one of an input section and a display section on the frond side. The housings are circularly arranged so that the front side of each housing is on an outer side and connected with each other so that adjacent housings are foldable with each other facing back to back. According to a preferred mode of the first aspect, the housings are connected together such that the first housing and the second housing are connected together, the second housing and the third housing are connected together, the third housing and the fourth housing are connected together, and the fourth housing and the first housing are connected together.

According to a second aspect of the present invention, there is provided a mobile terminal comprising a first housing, a second housing, a third housing and a fourth housing having a front side and a back side and having at least one of an input section and a display section on the frond side. A first hinge connects one end of the first housing with one end of the second housing, a second hinge connecting the other end of the second housing with one end of the third housing, a third hinge connecting the other end of the third housing with one end of the fourth housing, and a fourth hinge connecting the other end of the fourth housing with the other end of the first housing. The housings are circularly arranged so that the front side of each housing is on the outer side and connected with each other.

According to a preferred mode of the first and second aspects, the first housing and the third housing have a substantially same (similar) size. The second housing and the fourth housing have a substantially same (similar) size.

According to a preferred mode of the first and second aspects, the mobile terminal has a first use state in which the front side of the first housing and the front side of the second housing form a substantially rectangular shape on a substantially same plane, and the front side of the third housing and the front side of the fourth housing form a rectangular shape on a same plane; and a second use state in which the front side of the first housing and the front side of the fourth housing form a substantially rectangular shape on a same plane, and the front side of the second housing and the front side of the third housing form a substantially rectangular shape on a substantially same plane.

According to a preferred mode of the first and second aspects, the mobile terminal further comprises a first sensor sensing (transformation to) the first use state, and a second sensor sensing (transformation to) the second use state, and a display controlling section controlling at least one display of the display sections in the housings corresponding to the use states if the first sensor senses (the transformation to) the first use state, or the second sensor senses (the transformation to) the second use state.

According to a preferred mode of the first and second aspects, the first housing and the second housing have a display section, respectively. The display controlling section divides one image information to be displayed, displays the divided image information with the display section of the first housing and the display section of the second housing so as to display the one image information by combining the display of the display section of the first housing with the display of the display section of the second housing if the first sensor senses (the transformation to) the first use state.

The meritorious effects of the present invention are summarized as follows.

According to the present invention, in a mobile phone having multiple functions, an operation to use a desired function is easy when the desired function is used.

According to the present invention, in a mobile phone having multiple functions, displays can be easily converted corresponding to a desired function when the desired function is used.

BRIEF DESCRIPTIONS OF THE DRAWINGS

FIG. 3 is a block diagram illustrating an internal configuration of a mobile phone MF1.

EXPLANATION OF SIGNS

Figure 1A:
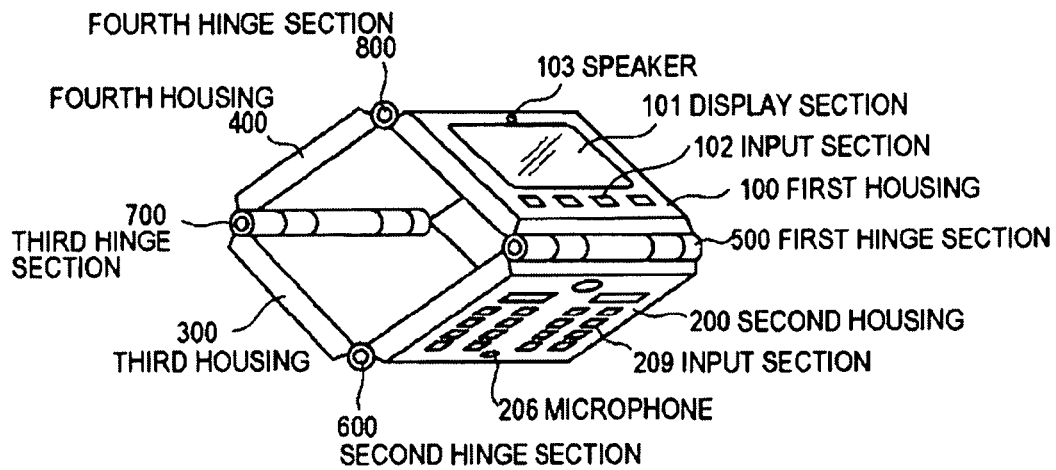
FIG. 1 (FIGS. 1A-1D) illustrates an external appearance of a mobile phone MF1 according to a first exemplary embodiment of the present invention.

MF1, MF2 mobile phone
100 first housing section
200 second housing section
300 third housing section
400 fourth housing section
500 first hinge section
600 second hinge section
700 third hinge section
800 fourth hinge section
101 display section
102 input section
103 speaker
201 control section
202 display controlling section
203 memory section
204 speech processing section
205 speaker
206 microphone
207 wireless section
208 antenna
209 input section
210, 211 sensor
301 display section
302 input section
303 speaker
401 display section
402 input section

PREFERRED MODES OF THE INVENTION

A mobile phone which is an exemplary embodiment of the present invention will be explained in detail below referring to drawings.

First Exemplary Embodiment

Figure 1B:
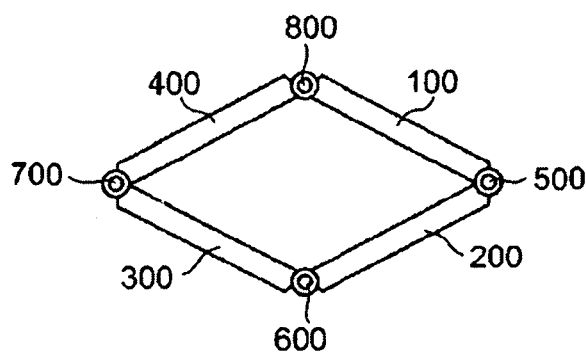
Figures 1C, 1D:
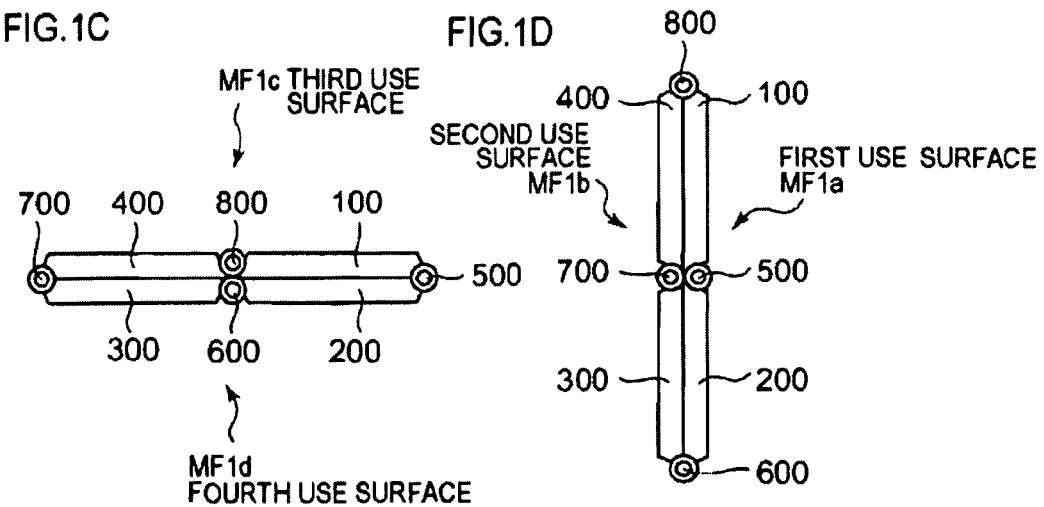

FIG. 1 (FIGS. 1A-1D) illustrates an external appearance of a mobile phone MF1 according to a first exemplary embodiment of the present invention. FIG. 1A is a perspective view illustrating the appearance of the mobile phone MF1. FIG. 1B is a side view illustrating the external appearance of the mobile phone MF1. FIGS. 1C and 1D are side views illustrating the external appearance of the mobile phone MF1 in use states.

The mobile phone MF1 has a first housing section 100, a second section housing 200, a third housing section 300, a fourth housing section 400, a first hinge section 500, a second hinge section 600, a third hinge section 700, and a fourth hinge section 800.

The first hinge section 500 is a hinge mechanism connecting one end of the first housing section 100 with the second housing section 200 rotatively. The second hinge section 600 is a hinge mechanism connecting the other end of the second housing section 200 with one end of the third housing section 300 rotatively. The third hinge section 700 is a hinge mechanism connecting the other end of the third housing section 300 with one end of the fourth housing section 400 rotatively. The fourth hinge section 800 is a hinge mechanism connecting the other end of the fourth housing section 400 with the other end of the first housing section 100 rotatively.

Each hinge section rotatively connects the housing sections by a known configuration, and is a connection section fixing the housing sections in the states illustrated in FIGS. 1C and 1D. Each hinge section also serves as a driving function and makes a limber folding movement possible. It is preferred that the first housing section 100 is substantially (almost) as large as the third housing section 300 and that the second housing section 200 is substantially (almost) as large as the fourth housing section 400.

Figure 2A:
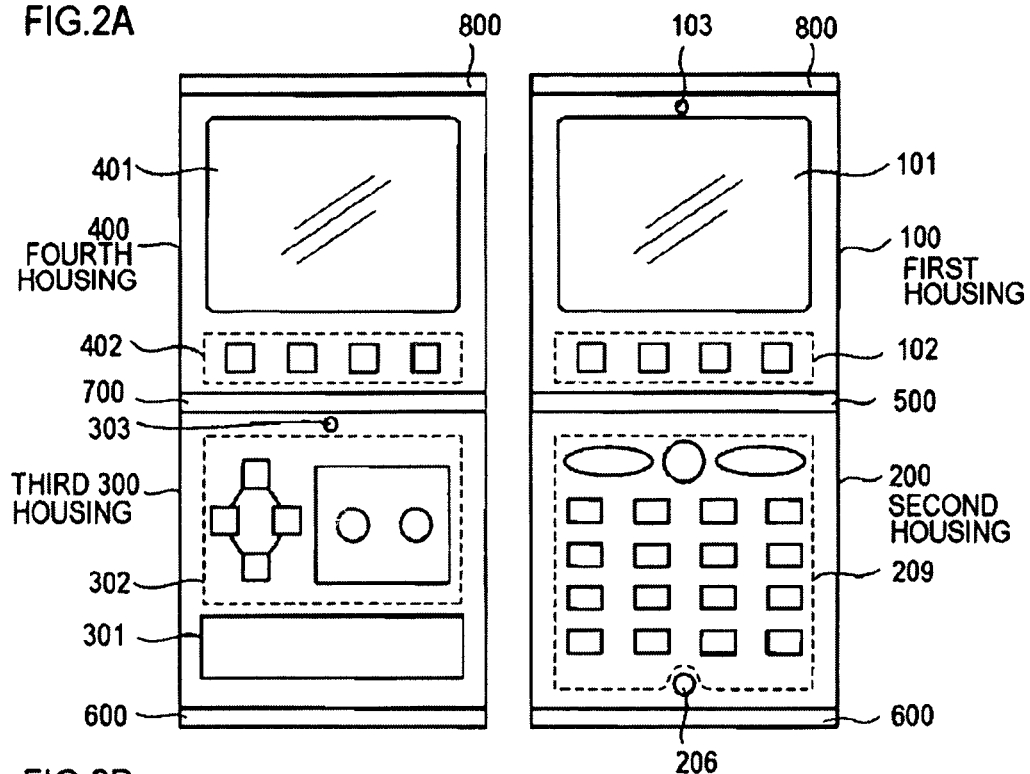
FIG. 2 (FIGS. 2A, 2B) is front views illustrating an external appearance of a mobile phone MF1.
Figure 2B:
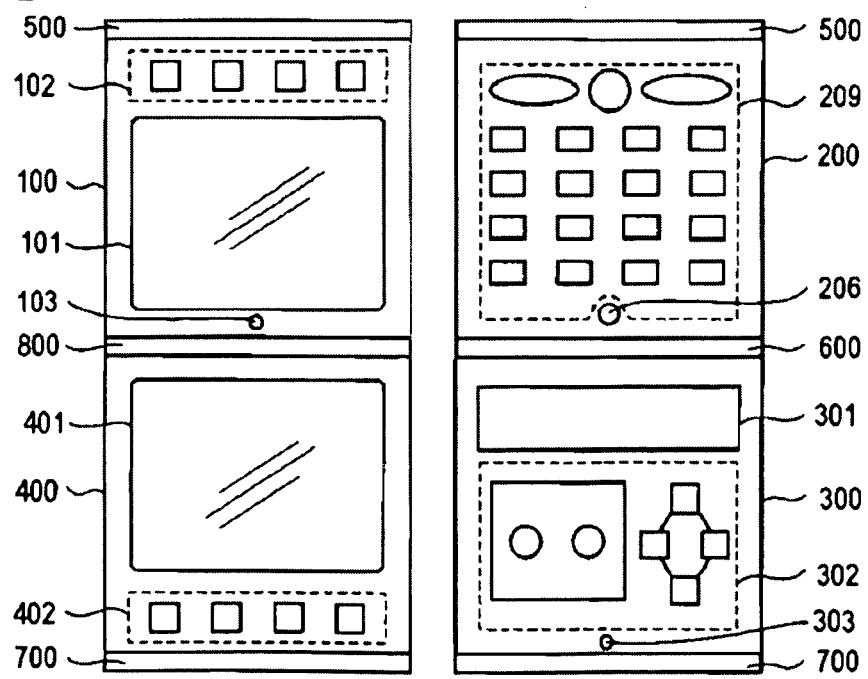

FIG. 2 is front (plan) views illustrating the external appearance of the mobile phone MF1. FIG. 2A illustrates each outer surface (front side) of the mobile phone MF1 illustrated in FIG. 1D, and FIG. 2B illustrates each outer surface (front side) of the mobile phone MF1 illustrated in FIG. 1C.

In the outer surface (front side) of the first housing section 100, a display section 101, an input section 102 and a speaker 103 are provided.

In the outer surface of the second housing section 200, a microphone 206 and an input section 209 are provided. In the outer surface of the third housing section 300, a display section 301, an input section 302 and a speaker 303 are provided. In the outer surface (front side) of the fourth housing section 400, a display section 401 and an input section 402 are provided.

By this formulation, if, as shown in FIG. 1D, a back side of the first housing section 100 is in contact with a back side of the fourth housing section 400, and a back side of the second housing section 200 is in contact with a back side of the third housing section 300, as shown in FIG. 2A, a front side of the first housing section 100 and a front side of the second housing section 200 form a substantially (almost) rectangle shape on a substantially same plane, and the third housing section 300 and the fourth housing section 400 form a substantially (almost) rectangle shape on a substantially same plane. The state illustrated in FIG. 1D (FIG. 2A) is referred to as a first use state below. On the other hand, in the state illustrated in FIG. 1C, the front side illustrated in FIG. 2B is formed. The state illustrated in FIG. 1C (FIG. 2B) is referred to as a second use state below.

A surface formed by the front side of the first housing section 100 and the front side of the second housing section 200 is referred to as a first use surface MF1a. A surface formed by the front side of the third housing section 300 and the front side of the fourth housing section 400 is referred to as a second use surface MF1b. A surface formed by the front side of the first housing section 100 and the front side of the fourth housing section 400 is referred to as a third use surface MF1c. A surface formed by the front side of the second housing section 200 and the front side of the third housing section 300 is referred to as a fourth use surface MF1d.

FIG. 3 is a block diagram illustrating the internal configuration of the mobile phone MF1. The second housing section 200 has a control section 201, a display controlling section 202, a memory section 203, a speech processing section 204, a speaker 205, a microphone 206, a wireless section 207, an antenna 208, an input section 209, and sensors 210, 211.

The control section 201 controls the whole mobile phone MF1 based on controlling programs of various types storing in a ROM according to an operation information input from each input section.

The display controlling section 202 outputs an image to be displayed by the display section and controls the display of each display section based on an instruction of the control section 201. The display controlling section 202 controls at least one display section of each housing section according to the use state sensed by the sensor 210 or sensor 211, for example.

The memory section 203 stores data of various types such as a telephone directory.

The speech processing section 204 outputs a received speech information, a speech information made by the control section 201 and others to each speaker, and performs processing converting a speech information input from each microphone.

The wireless section 207 is connected with the antenna 208 and performs processing transmitting and receiving information of various types. The antenna 208 may be built-in in the mobile phone MF1.

The input section 209 has a numeric keys (or keypads) and the like and outputs an operation information input by the user to the control section 201.

The sensor 210 senses the first use state of the mobile phone MF1 when the mobile phone assumes this state and outputs the sensed information to the control section 201.

The sensor 211 senses the second use state of the mobile phone MF1 when the mobile phone assumes this state and outputs the sensed information to the control section 201.

The first housing section 100 has a display section 101, a input section 102 and a speaker 103. The third housing section 300 has a display section 301, an input section 302 and a speaker 303. The fourth housing section 400 has a display section 401 and an input section 402.

The display sections 101, 301, 401 are a liquid crystal display section displaying various images output by the display controlling section 202.

The input sections 102, 302, 402 have a plurality of input keys and Output the operation information input by the user to the control section 201.

The speakers 103, 303 are speakers outputting the speech information output by the speech processing section 204.

Next, an action of the mobile phone MF1 will be explained. The mobile phone MF1 is usually used in the first use state or second use state.

The second use surface MF1b in the first use state is mainly suitable for playing a game using operation buttons of the input section 302 of the third housing section 300 and the display section 401 of the fourth housing section 400. On the other hand, the first use surface MF1a in the first use state is mainly suitable for the telephone conversation because the formulation of the first use surface MF1a is substantially similar to the ordinary mobile phone.

In the first use state, if the telephone conversation starts during a game is played using the second used surface MF1b, the telephone call can be easily received by using the first use surface MF1a which is a back side of the second use surface MF1b.

As shown in FIG. 2B, the third use surface MF1c in the second use state can form one display by the display section 101 and display section 401. The third use surface MF1c is suitable for viewing a dynamic image using the mobile phone MF1 because a relatively large display can be used for viewing. If a game is played with a laterally elongated display/screen, the third use surface MF1c may be used. On the other hand, the fourth use surface MF1d in the second use state may be used for the telephone conversation because the fourth use surface MF1d has a formulation changed in the form from the ordinary mobile phone.

Next, transformation (conversion or change in the form) of the mobile phone MF1 from the first use state to the second use state will be explained.

In the mobile phone MF1 of the first use state, the user holds a surrounding area of the first hinge section 500 and a surrounding area of the third hinge section 700, and pulls the first hinge section 500 and the third hinge section 700 in directions of aparting from each other. Then, the mobile phone MF1 assumes the second use state via the state shown in FIG. 1B.

When the transformation is finished, a sensor 211 senses the transformation to the second use state and outputs a sensed information to a control section 201. If the control section 201 receives the sensed information, the control section 201 sends an instruction to a display controlling section 202. The display controlling section 202 divides one-image information to be displayed and displays the divided image information on a display section 101 and a display section 401. By controlling the display like this, a combination of the display section 101 and a display section 401 forms one image information concerned, and therefore the image display of the display section can be enlarged easily.

On the other hand, when the control section 201 receives the sensed information, it sends an instruction to each section depending on setting, controls display of the input information, image display, output of microphone and speaker and the like suitably, and controls at least one display of the display sections corresponding to the use state.

Next, transformation of the mobile phone MF1 from the second use state to the first use state will be explained.

In the mobile phone MF1 in the second use state, the user holds a surrounding area of the second hinge section 600 and a surrounding area of the fourth hinge section 800, and pulls the second hinge section 600 and the fourth hinge section 800 in direction of aparting from each other. Then, the mobile phone MF1 assumes the first use state via the state shown in FIG. 1B.

When the transformation is finished, a sensor 210 senses the transformation to the first use state and outputs the sense information to the control section 201. If the control section 201 receives the sensed information, the control section 201 sends an instruction to the display controlling section 202 to display one image information, which has been divided and displayed with the display section 101 and the display section 401, with any one of the display sections 101 and 401 depending on setting.

On the other hand, when the control section 201 receives the sensed information, sends an instruction to each section depending on setting, controls the display of the input information, the image display, the output of the microphone and speaker and the like suitably, and controls at least one display of the display sections corresponding to the use state.

Second Exemplary Embodiment

Figure 4A:
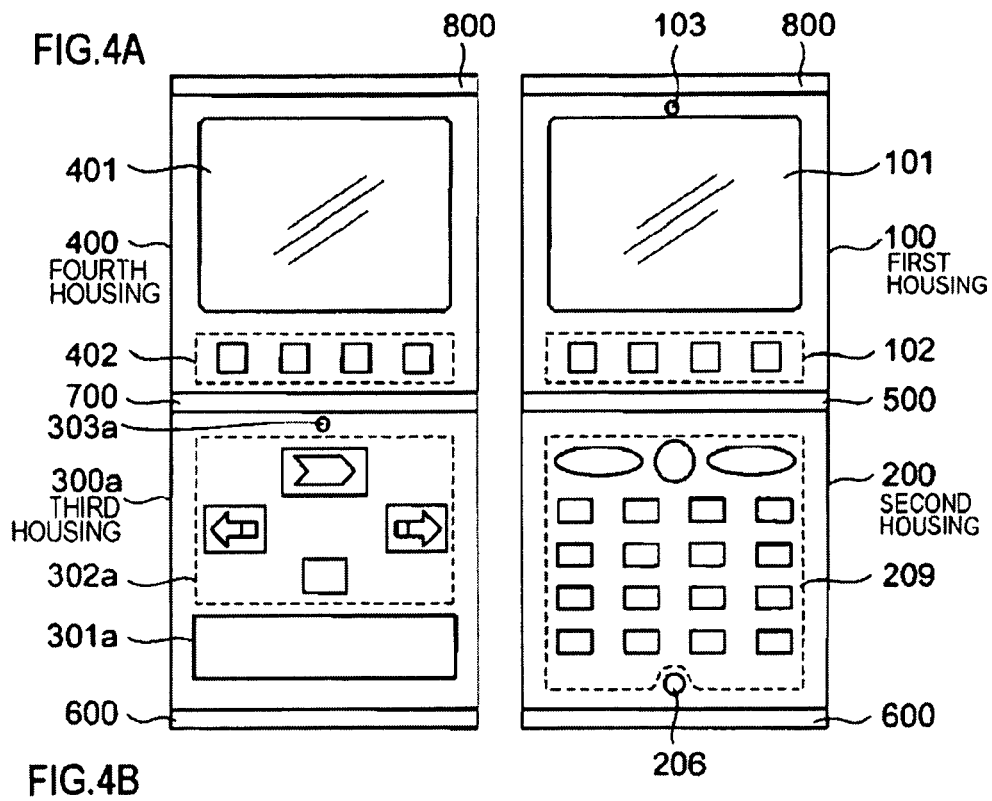
FIG. 4 (FIGS. 4A, 4B) is front views illustrating an external appearance of a mobile phone MF2 according to a second exemplary embodiment of the present invention.

FIG. 4 is plan views illustrating an external appearance of a mobile phone MF2 according to a second exemplar.

In the second exemplary embodiment, one part of the third housing section 300 in the mobile phone MF1 according to the first exemplary embodiment is modified, and the remaining formulation is same as that of the mobile phone MF1.

In the outer surface (front side) of the third housing section 300a included in the mobile phone MF2, a display section 301a, an input section 302a and a speaker 303a are provided. The input section 302a has operation buttons suitable for an operation of an audio player. Thus a surface formed by the outer surface (front side) of the third housing section 300a and an outer surface (front side) of a fourth housing section 400 may be effectively used for listening music using an audio player function.

Figure 4B:
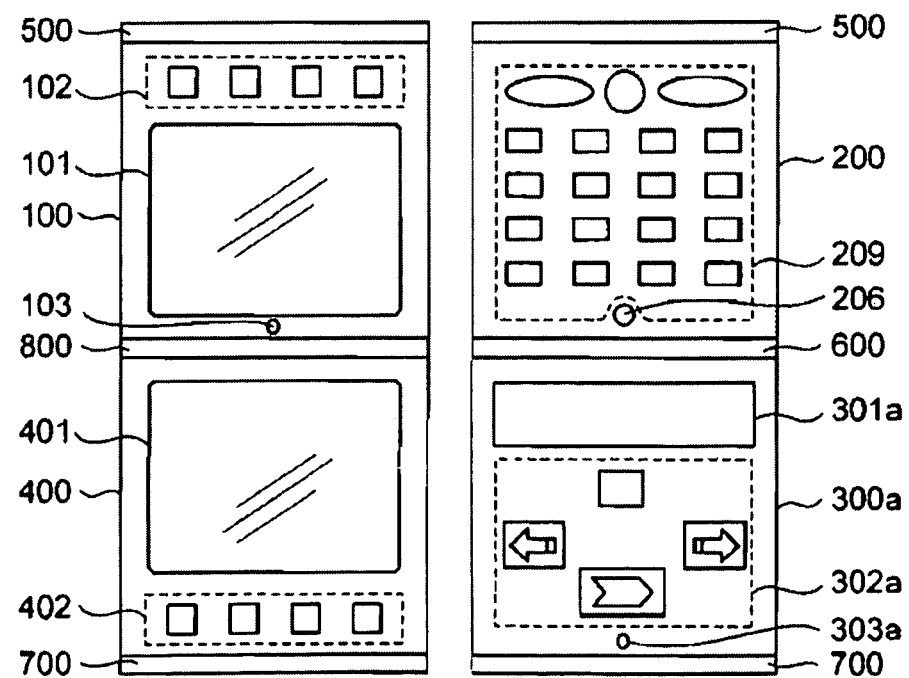

In a state shown in FIG. 4B, a surface formed by the front side of the first housing section 100 and the front side of the fourth housing section 400 is suitable for viewing a dynamic image with the mobile phone MF2 in the same way as the first exemplary embodiment. On the other hand, a surface formed by a front side of a second housing section 200 and the front side of the third housing section 300a has a configuration changed in design from an ordinary mobile phone, and therefore may be used for telephone conversation and for listening music using the display section 301a, the input section 302a and others.

In the state shown in FIG. 4B, one surface may be used for viewing a dynamic image, and the other surface may be used for listening music.

According to each exemplary embodiment, the transformation between the first use state and the second use state can be suitably performed by the easy operation. Also, since two use surfaces are provided in each use state, four different use surfaces can be provided in one mobile phone.

If one function is assigned to each use surface, and a setting is made so as to start the function corresponding to each use surface when the transformation to each use state is finished, for example, start states of at least four functions can be easily operated in one mobile phone.

Also, since by sensing each use sate by the sensors, the setting corresponding to each use state can be performed automatically by way of software, too, it is unnecessary to do a complicated operation for starting a desired function. Variations can be further increased by performing a display control such as reversing of the display of the display section.

The mobile phone MF1 may be transformed and used according to the uses, giving an example that the third use surface MF1c is convenient for viewing the television, whereas the second use surface MF1b is easier to operate a game, etc.

The mobile phone can be also compatible to various future services because four use surfaces can be easily operated in one mobile phone.

By making the formulation simple so as to eliminate influence on the functional property, consideration can be given so as not to lose functions of the conventional mobile phone. Also a roll to structurally support practicing various functions can be performed.

According to each exemplary embodiment, in the mobile phone having a plurality of functions, the operation to use a desired function is easy when the desired function is used. In the mobile phone having a plurality of functions, the display can be easily converted so as to correspond to the use of the desired function when the desired function is used.

Each use surface shown in each exemplary embodiment may be made to a use surface suitable for use(s) other than the telephone, game, viewing the television and music player.

Each exemplary embodiment may be applied to a mobile phone having a function receiving television images

INDUSTRIAL APPLICABILITY

In addition to the mobile phone, the present invention may be applied to a mobile device, an information processing device corresponding to multipurpose multimedia and others, such as a PDA, a digital camera, an audio player and the like.

Although the prevent invention is explained based on the above exemplary embodiments, the present invention is not limited to the above exemplary embodiments. The present invention may include any modification and adjustment to the exemplary embodiments within the entire disclosure (including the claims) of the present invention based on the basic technical idea or concept. Within the scope of the claims of the present invention, various combinations and selections of disclosed elements are available. A further problem, object and exemplary embodiments of the present invention become apparent from the entire disclosure of the present invention including the claims.

The invention claimed is:

1. A mobile terminal comprising:
exactly four housings, including a first housing, a second housing, a third housing and a fourth housing having a front side and a back side and having at least one of an input section and a display section on said front side,
wherein exactly three of the four housings include a display section, the housing that does not include a display section including a physical input device other than a touch-screen, and exactly two of the three housings that each include a display section also include a speaker,
wherein the housings are arranged in a closed loop so that said front side of each housing is on an outer side and hingedly connected with each other so that adjacent housings are foldable with each other facing back to back, and
wherein the mobile terminal has:
a first use state in which said front side of said first housing and said front side of said second housing form a substantially rectangular shape on a substantially same plane, and said front side of said third housing and said front side of said fourth housing form a substantially rectangular shape on a substantially same plane, and
a second use state in which said front side of said first housing and said front side of said fourth housing form a substantially rectangular shape on a substantially same plane, and said front side of said second housing and said front side of said third housing form a substantially rectangular shape on a substantially same plane.

2. The mobile terminal according to claim 1, wherein:
the housings are hingedly connected together such that said first housing and said second housing are connected together, said second housing and said third housing are connected together, said third housing and said fourth housing are connected together, and said fourth housing and said first housing are connected together.

3. The mobile terminal according to claim 1, wherein:
said first housing and said third housing have a substantially same size; and
said second housing and said fourth housing have a substantially same size.

4. The mobile terminal according to claim 1, further comprising:
a first sensor sensing transformation to said first use state, and a second sensor sensing transformation to said second use state; and
a display controlling section controlling at least one display of said display sections in the housings corresponding to the use states if said first sensor senses the transformation to said first use state, or said second sensor senses the transformation to said second use state.

5. The mobile terminal according to claim 4, wherein:
said first housing and said second housing have a display section, respectively, and
said display controlling section divides one image information to be displayed, displays the divided image information with said display section of said first housing and said display section of said second housing so as to display said one image information by combining the display of said display section of said first housing with the display of said display section of said second housing if said first sensor senses the transformation to said first use state.

6. A mobile terminal comprising:
exactly four housings, including a first housing, a second housing, a third housing and a fourth housing having a front side and a back side and having at least one of an input section and a display section on said front side; and
a first hinge connecting one end of said first housing with one end of said second housing, a second hinge connecting the other end of said second housing with one end of said third housing, a third hinge connecting the other end of said third housing with one end of said fourth housing, and a fourth hinge connecting the other end of said fourth housing with the other end of said first housing,
wherein exactly three of the four housings include a display section, the housing that does not include a display section including a physical input device other than a touch-screen, and exactly two of the three housings that each include a display section also include a speaker,
wherein the housings are arranged in a closed loop so that said front side of each housing is on an outer side and connected with each other, and
wherein the mobile terminal has:
a first use state, in which said front side of said first housing and said front side of said second housing form a substantially rectangular shape on a substantially same plane, and said front side of said third housing and said front side of said fourth housing form a substantially rectangular shape on a substantially same plane; and
a second use state, in which said front side of said first housing and said front side of said fourth housing form a substantially rectangular shape on a substantially same plane, and said front side of said second housing and said front side of said third housing form a substantially rectangular shape on a substantially same plane.

7. The mobile terminal according to claim 6, wherein:
said first housing and said third housing have a substantially same size, and
said second housing and said fourth housing have a substantially same size.

8. The mobile terminal according to claim 6, further comprising:
a first sensor sensing transformation to said first use state, and a second sensor sensing transformation to said second use state; and
a display controlling section controlling at least one display of said display sections in the housings corresponding to the use states if said first sensor senses the transformation to said first use state, or said second sensor senses the transformation to said second use state.

9. The mobile terminal according to claim 8, wherein:
said first housing and said second housing have a display section, respectively, and
said display controlling section divides one image information to be displayed, displays the divided image information with said display section of said first housing and said display section of said second housing so as to display said one image information by combining the display of said display section of said first housing with the display of said display section of said second housing if said first sensor senses the transformation to said first use state.

* * * * *